(12) United States Patent
Nykerk

(10) Patent No.: US 11,506,359 B2
(45) Date of Patent: Nov. 22, 2022

(54) HOMOGENOUS LIT LINE IMAGE VEHICLE LAMP ASSEMBLY

(71) Applicant: Flex-N-Gate Advanced Product Development, LLC, Tecumeseh (CA)

(72) Inventor: Todd Nykerk, Holland, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 0 days.

(21) Appl. No.: 17/333,482

(22) Filed: May 28, 2021

(65) Prior Publication Data

US 2021/0372592 A1 Dec. 2, 2021

Related U.S. Application Data

(60) Provisional application No. 63/032,809, filed on Jun. 1, 2020.

(51) Int. Cl.
| | |
|---|---|
| *F21S 41/143* | (2018.01) |
| *F21S 41/151* | (2018.01) |
| *F21S 41/24* | (2018.01) |
| *F21V 8/00* | (2006.01) |
| *F21S 41/20* | (2018.01) |
| *F21Y 115/10* | (2016.01) |
| *F21V 9/40* | (2018.01) |

(52) U.S. Cl.
CPC .............. *F21V 9/40* (2018.02); *F21S 41/143* (2018.01); *F21S 41/151* (2018.01); *F21S 41/24* (2018.01); *F21S 41/285* (2018.01); *G02B 6/0006* (2013.01); *F21Y 2115/10* (2016.08)

(58) Field of Classification Search
CPC ......... F21S 41/285; F21S 41/24; F21S 43/237
See application file for complete search history.

(56) References Cited

U.S. PATENT DOCUMENTS

| | | | |
|---|---|---|---|
| 7,086,765 | B2 | 8/2006 | Wehner |
| 7,341,365 | B2 | 3/2008 | Basile et al. |
| 9,772,085 | B2 | 9/2017 | Dubose |
| 9,976,708 | B2 * | 5/2018 | Sobczyk ................. F21V 5/043 |
| 10,443,790 | B2 | 10/2019 | George et al. |
| 11,052,816 | B2 * | 7/2021 | Muegge ................. F21S 43/15 |

(Continued)

FOREIGN PATENT DOCUMENTS

WO 2018119344 A1 6/2018

OTHER PUBLICATIONS

PCT Patent Application PCT/US2021/034793 International Search Report and Written Opinion dated Sep. 9, 2021.

*Primary Examiner* — Eric T Eide
(74) *Attorney, Agent, or Firm* — Avek IP, LLC

(57) ABSTRACT

A lamp assembly for a vehicle includes a plurality of light-emitting diodes (LEDs) mounted in or on the vehicle and arranged in a linear pattern. An elongated optical member is disposed longitudinally along the linear pattern of LEDs. The elongated optical member is configured to receive light emitted from the LEDs and project a corresponding plurality of lit images. A vehicle lamp assembly includes a plurality of LEDs mounted to a printed-circuit board to form a linear array. A primary light pipe is disposed adjacent to the linear array of LEDs and aligned longitudinally along the linear array of LEDs, such that light emitted from each of the LEDs of the linear array traverses radially through the primary light pipe.

13 Claims, 8 Drawing Sheets

(56) References Cited

U.S. PATENT DOCUMENTS

| | | | |
|---|---|---|---|
| 2004/0080938 A1* | 4/2004 | Holman | G02F 1/133605 |
| | | | 362/231 |
| 2009/0168419 A1* | 7/2009 | Daimon | F21K 9/68 |
| | | | 362/235 |
| 2011/0280039 A1* | 11/2011 | Kishimoto | F21S 41/24 |
| | | | 362/554 |
| 2014/0169014 A1 | 6/2014 | Jungwirth et al. | |
| 2014/0204602 A1 | 7/2014 | Jungwirth et al. | |
| 2015/0330593 A1* | 11/2015 | Larsen | F21S 43/245 |
| | | | 362/511 |
| 2016/0091162 A1* | 3/2016 | Dubose | G02B 6/0005 |
| | | | 362/511 |
| 2018/0149335 A1* | 5/2018 | Paroni | G02B 27/0961 |
| 2019/0072708 A1* | 3/2019 | Liu | B60Q 1/2611 |
| 2019/0293857 A1* | 9/2019 | Martoch | F21S 43/247 |
| 2020/0003382 A1 | 1/2020 | Godderidge et al. | |
| 2020/0103086 A1* | 4/2020 | Zozgornik | F21V 5/008 |
| 2020/0116323 A1 | 4/2020 | Nykerk | |

* cited by examiner

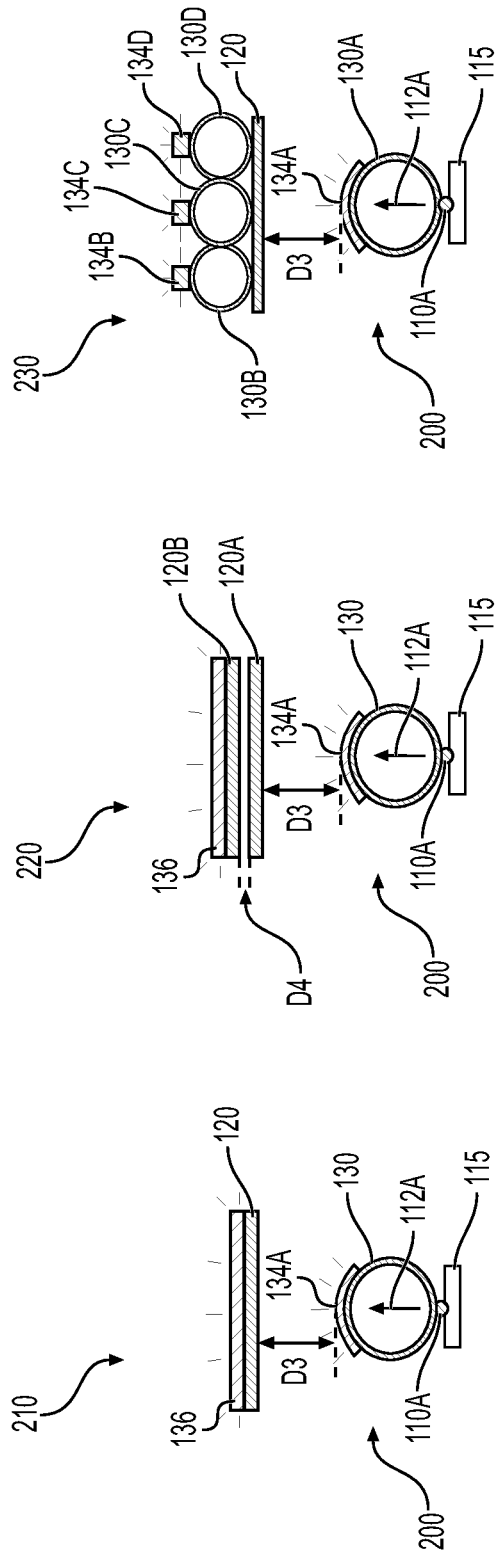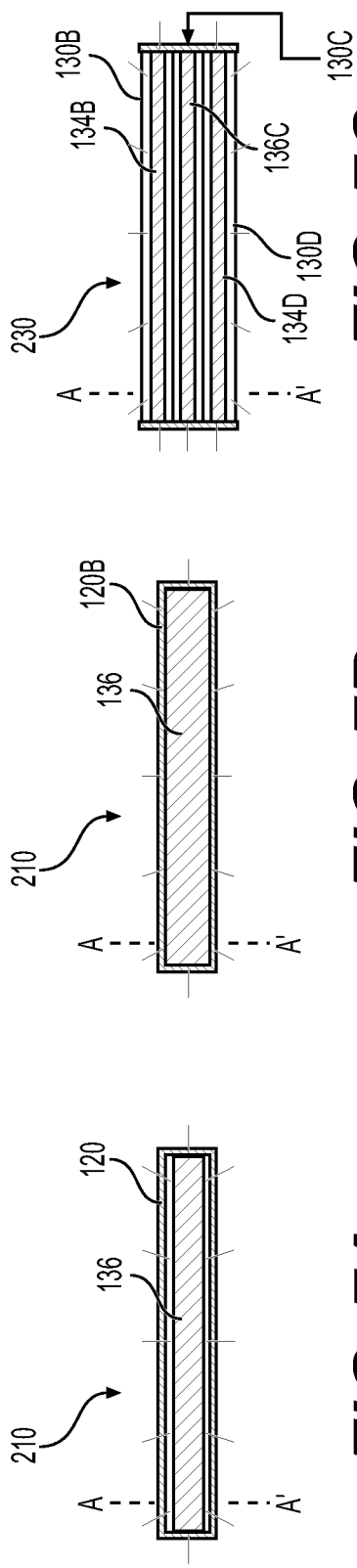

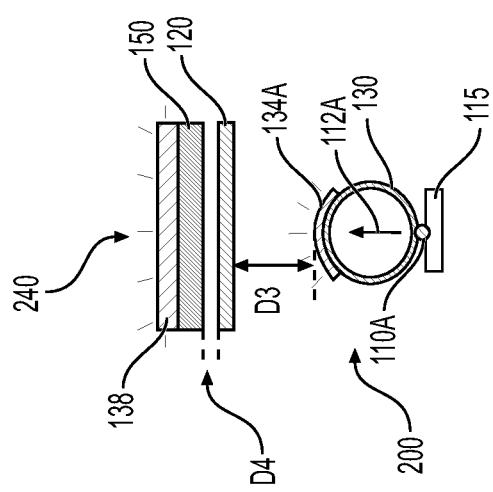
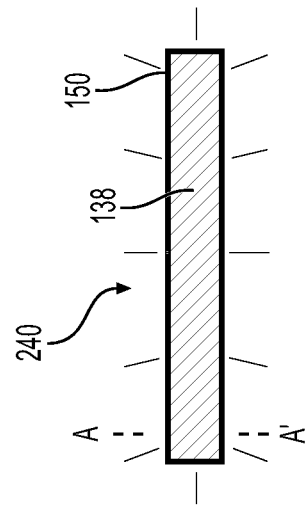

HOMOGENOUS LIT LINE IMAGE VEHICLE LAMP ASSEMBLY

CROSS-REFERENCE TO RELATED APPLICATIONS

This application claims the benefit of U.S. Provisional Application No. 63/032,809 entitled "Homogenous Lit Line Image Vehicle Lamp Assembly" and filed on Jun. 1, 2020, which is herein incorporated by reference in its entirety.

BACKGROUND

1. Field of the Disclosure

Embodiments of this disclosure relate generally to vehicle lamps. More specifically, embodiments of this disclosure include vehicle lamps configured to provide multiple homogenous lit line images.

2. Description of the Related Art

Many different types of vehicle lighting assemblies having a light pipe have been described in the prior art. For example, U.S. Pat. No. 10,443,790 to George et al. discloses a light pipe assembly with a LED light source at one end. The pipe has a surface with an emitting portion and an overlay portion, along with a reflective secondary surface. U.S. Pat. No. 9,772,085 to Dubosc discloses an optical light emission system for vehicles comprised of two lighting subsystems with a light guide for mixing and homogenizing the two light sources. U.S. Pat. No. 7,341,365 to Basile discloses an LED unit for a vehicle lamp assembly having a housing, LEDs, a light pipe, and an optic structure. The optic structure is used to scatter light in a series of directions distal to the housing. U.S. Pat. No. 7,086,765 to Wehner discloses an LED lamp assembly with an array of LEDs that emit light onto a reflector, and the reflector reflects the light into a light beam. A light pipe is positioned in front of the reflector and receives light from a separate LED at its end.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In an embodiment, a lamp assembly for a vehicle includes a plurality of light-emitting diodes (LEDs) mounted in or on the vehicle, the plurality of LEDs being arranged in a linear pattern. An elongated optical member is disposed longitudinally along the linear pattern of the plurality of LEDs. The elongated optical member is configured to receive light emitted from the plurality of LEDs and project a corresponding plurality of lit images.

In another embodiment, a vehicle lamp assembly includes a plurality of LEDs mounted to a printed-circuit board to form a linear array of LEDs. A primary light pipe is disposed adjacent to the linear array of LEDs and aligned longitudinally along the linear array of LEDs, such that light emitted from each of the LEDs of the linear array traverses radially through the primary light pipe.

BRIEF DESCRIPTION OF THE DRAWINGS

Illustrative embodiments of the present disclosure are described in detail below with reference to the attached drawing figures, which are incorporated by reference herein and wherein:

FIG. 6A is a cross-sectional side view of an embodiment of a line-image lighting system;

FIG. 6B is a cross-sectional side view of another embodiment of a line-image lighting system;

FIG. 6C is a cross-sectional side view of yet another embodiment of a line-image lighting system;

FIG. 7A is a top-down view of the line-image lighting system of FIG. 6A;

FIG. 7B is a top-down view of the line-image lighting system of FIG. 6B;

FIG. 7C is a top-down view of the line-image lighting system of FIG. 6C;

FIG. 8A is a cross-sectional side view of yet another embodiment of a line-image lighting system;

FIG. 8B is a top-down view of the line-image lighting system of FIG. 8A; and

Figure 1:
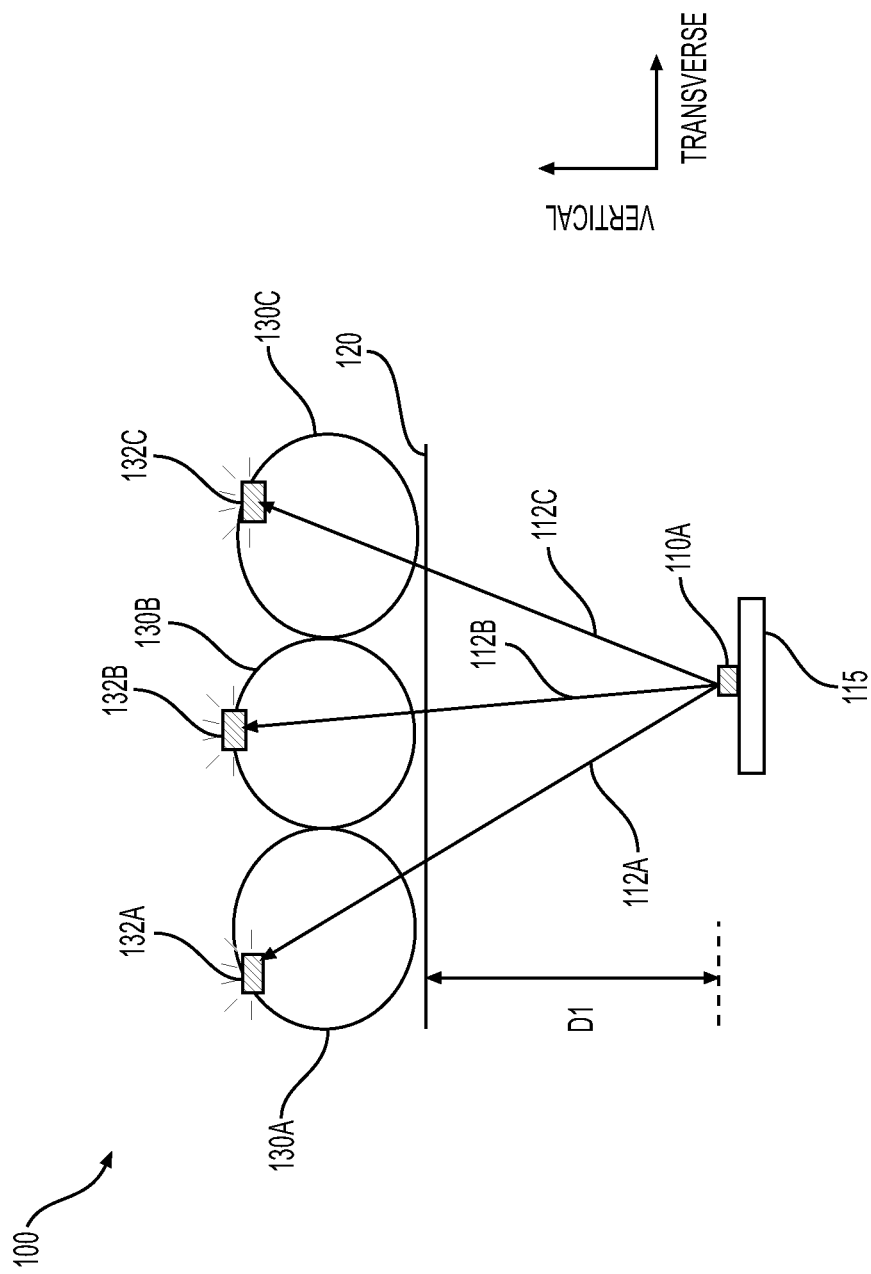
FIG. 1 is a cross-sectional side view of a line-image lighting system, in an embodiment.

The drawing figures do not limit the invention to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments of this disclosure provide lighting arrangements for vehicle lamps, including lighting arrangements that are configured to generate multiple homogeneous lit line images and produce a uniform and high intensity light output. Specifically, the lighting arrangements include a line/string of light-emitting diodes (LEDs), at least one elongated optical member, e.g., at least one light pipe (which in the disclosed embodiments is a cylindrical light pipe), and optionally a diffusing element arranged between the LEDs and the at least one light pipe (e.g., optical films or sheets in the disclosed embodiment). These elements are arranged together in a vehicle lamp, such that each of the elongated optical members (e.g., cylindrical light pipes) acts as a lens that radially focuses light from the string of LEDs. In certain embodiments, the LEDs are configured to output animated lighting effects, and in some embodiments, the lighting arrangements are configured to provide a light output sufficient to meet automotive lighting requirements. However, different types of light sources other than LEDs may be employed without departing from the scope hereof.

FIG. 1 is a cross-sectional side view of an exemplary line-image lighting system 100. Line-image lighting system 100 may be integrated with a vehicle lamp assembly, including but not limited to headlight and taillight assemblies, daylight-running lights (DRLs), center high-mounted stop lamps, multi-function light assemblies, fog lamps, and turn signals. A first light source 110A is for example a LED mounted on a printed circuit board (PCB) 115. An optical sheet 120 is disposed a predetermined distance D1 from the first light source 110A. At least one light pipe is disposed immediately adjacent the optical sheet opposite the light source. In this disclosure, the term "immediately adjacent" means that two objects are right next to one another without another structure in between; the two objects may or may not be touching each other, but any gap therebetween is small (e.g., at least one order of magnitude less than the distance D1).

In the embodiment depicted in FIG. 1, a first light pipe 130A, a second light pipe 130B, and a third light pipe 130C are disposed immediately adjacent optical sheet 120 opposite the first light source 110A. Line-image lighting system 100 may include greater than three or fewer than three light pipes without departing from the scope hereof First light source 110A is configured for transmitting light to pass through each of light pipes 130A-130C at an oblique angle between the vertical and transverse axes depicted in FIG. 1. In other words, light emitted from first light source 110A travels through light pipe substantially along a diameter of the light pipe, and the light exits and enters opposing sides of the light pipe depending on the angle at which the light enters. The arrangement of light pipes 130A-130C oriented vertically above first light source 110A, as depicted in FIG. 1, contrasts with a typical light pipe arrangement where a light source projects light into an end of a light pipe for propagating light lengthwise along a longitudinal direction of the light pipe, e.g., via total-internal reflection (TIR).

Figure 2A:
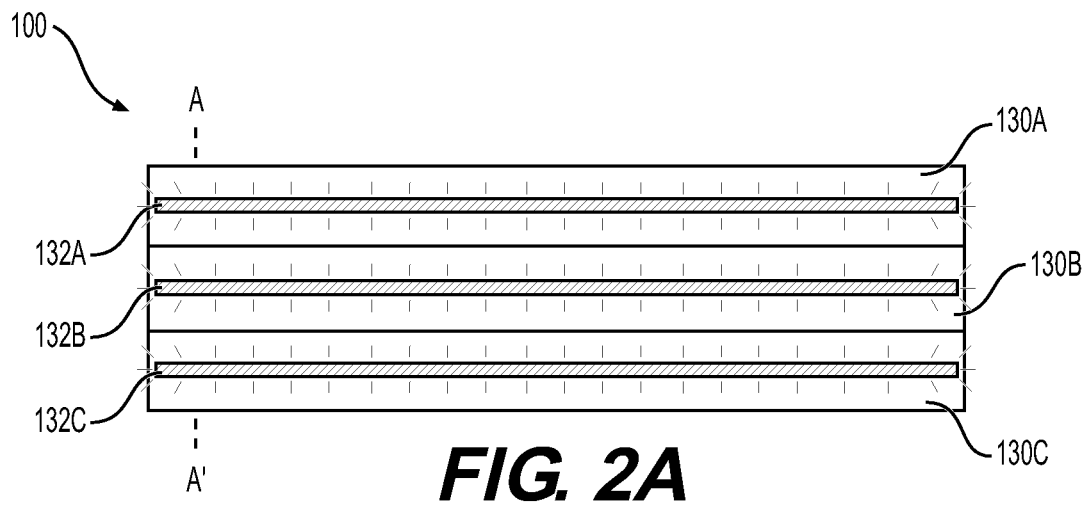
FIG. 2A is a top-down view of light pipes from the line-image lighting system of FIG. 1, in an embodiment.

In the figures, different portions of light beams emitted from light sources may be represented by arrows, which indicate a general direction of that portion of the light beam. For example, a first portion of emitted light from first light source 110A is represented by the arrow labeled 112A in FIG. 1. The first portion of emitted light 112A passes through optical sheet 120 and first light pipe 130A to produce a first lit line image 132A. Similarly, a second portion of light 112B passes through the optical sheet 120 and the second light pipe 130B to produce a second lit line image 132B, and a third portion of light 112C passes through the optical sheet 120 and the third light pipe 130C to produce a third lit line image 132C. By employing a line of light sources lengthwise along each of light pipes 130A-130C, a pattern of light may be projected along the length of each light pipe as depicted in FIG. 2A. The lit lines may be represented by shaded regions with dashes to represent an illuminated appearance.

Figure 2B:
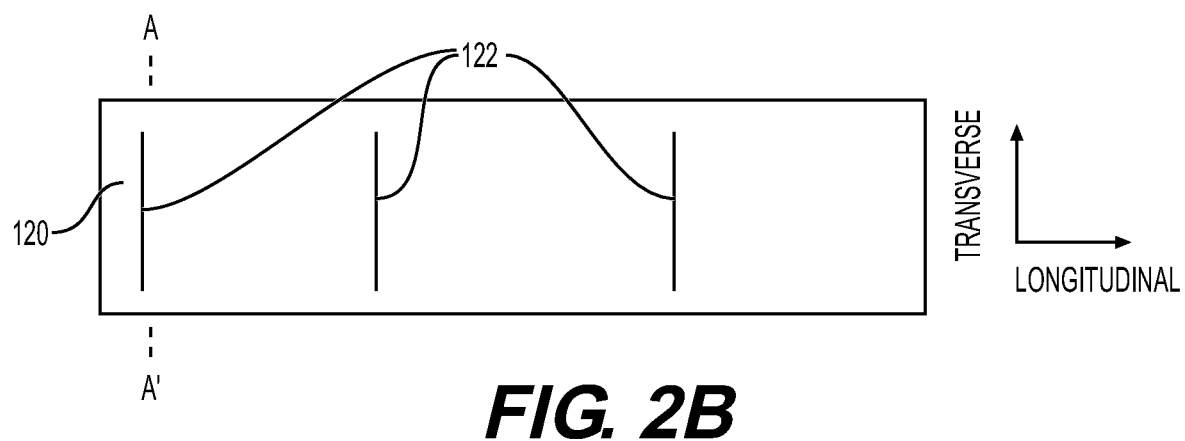
FIG. 2B is a top-down view of an optical sheet from the line-image lighting system of FIG. 1, in an embodiment.
Figure 2C:
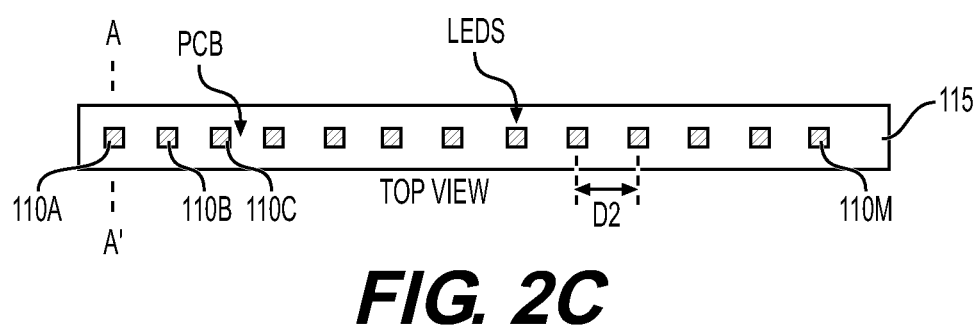
FIG. 2C is a top-down view of a line of a printed-circuit board with light sources from the line-image lighting system of FIG. 1, in an embodiment.

FIGS. 2A-2C illustrate a top-down view of various components of line-image lighting system 100. Specifically, FIG. 2A shows the first, second, and third light pipes 130A-C; FIG. 2B shows the optical sheet 120 (with light pipes 130A-C removed from view); and, FIG. 2C shows the line/string of light sources (with light pipes 130A-C and optical sheet 120 removed from view). The lines labeled A-A' shown in FIGS. 2A-2C illustrate the location of the cross section depicted in FIG. 1. The components, which are shown separately in FIGS. 2A-2C, are arranged together to form system 100, e.g., as shown in FIG. 1. In FIGS. 2A-2C, the components are depicted in straight lines along the longitudinal direction but each of the depicted components may be curved lengthwise along a curvilinear path to form a curvilinear lighting system for use in curved/swept vehicle lamp assemblies. FIGS. 1 and 2A-2C are best viewed together with the following description.

FIG. 2C is a top-down view of PCB 115 having a plurality of light sources 110A-110M mounted thereto. Not all light sources are labeled in FIG. 2C for clarity of illustration. The plurality of light sources 110A-110M are configured to provide a line/string of light sources (e.g., a linear array of LEDs) aligned along a longitudinal direction and arranged in a linear pattern. The plurality of light sources 110A-110M are mounted on PCB 115 and intermittently spaced a predetermined distance apart from one another, such as the distance labeled "D2" in FIG. 2C. In some embodiments, the plurality of light sources 110A-110M are arranged equidistant from one another on PCB 115 (i.e., each of the light sources 110A-110M is a distance D2 apart from one another). In other embodiments, distances between light sources 110A-110M may be non-uniform.

Each of the individual light sources 110A-110M may be independently lit and unlit via a controller (e.g., see below description of controller 450 in connection with FIG. 9) that is electrically and communicatively coupled with PCB 115. Light sources 110A-110M may be all of one type or of a plurality of types (e.g., sizes, colors, and/or intensities). In some embodiments, the light sources have a cone angle that is about 120-degrees wide. In other embodiments, the light sources have a cone angle that is about 60-degrees wide or about 30-degrees wide. Smaller cone angles provide increased intensity compared to larger cone angles but reduce the area that is effectively lit.

FIG. 2B is a top-down view of optical sheet 120 configured to homogenize light. Optical sheet 120 is, for example, a diffuser or diffusing element, such as an optical layer or an optical film, which is an optically clear sheet/film made of plastic. Optical sheet 120 includes an array of light-modifying elements, such as an array of convex lenses that focus light according to a particular refractive power (e.g., the inverse of focal length). The array of light-modifying elements may be aligned in a particular direction throughout a respective sheet for smoothing light in a desired direction. As depicted in FIG. 2B, light-modifying elements 122 have a transverse alignment in which the light-modifying elements are aligned with the transverse axis of the optical sheet 120 for homogenizing light along the longitudinal axis. Not all light-modifying elements are depicted for clarity of illustration. In this manner, the light pipes 130A-130C are disposed perpendicular to the light-modifying elements 122 (i.e., the light pipes 130A-130C are disposed along the longitudinal axis) such that light emitted from the individual light sources 110A-110M is smoothed along the longitudinal direction to provide a homogenous lit line image.

The light pipes themselves also contribute to smoothing the lit image. For example, each of the light pipes 130A-130C radially focuses the light received by light sources 110A-110M and the optical sheet 120, thereby collecting the emitted light and optically stabilizing the lit image, such that the lit image is visually consistent from various viewing angles. In certain embodiments, a plurality of optical sheets may be employed (see e.g., a first optical sheet 120A and a second optical sheet 120B described below in connection with FIG. 6B).

FIG. 2A is a top-down view of first, second, and third light pipes 130A, 130B, 130C. The light pipes 130A-130C are for example elongated optical members, such as cylindrical rods made of an optically clear plastic, e.g., polycarbonate (PC) or poly(methyl methacrylate) (PMMA). Each of the light pipes 130A-130C is arranged side-by-side adjacent to one another and disposed directly on top of the optical sheet 120 (see e.g., FIG. 1). The various components described above are arranged for producing a lit line image along each of the light pipes 130A-130C, indicated in FIG. 2A as a first lit line image 132A, a second lit line image 132B, and a third lit line image 132C. Each lit line image 132A-C is configured to appear as an individual homogenous line of light that is easily distinguishable from a neighboring lit line image.

Returning to FIG. 1, depending on the size, intensity, and cone angle of each of the light sources 110A-110M and their distance D2 apart from one another, together with the distance D1 between the light source string and the optical sheet 120, a desired pattern of lit line images 132A-132C is produced. For example, the distance D1 in the embodiment depicted in FIG. 1 is greater than a diameter of each of the light pipes 130A-130C. In some embodiments, the distance D2 is less than the distance D1. In certain embodiments, line-image lighting system 100 uses only one line/string of light sources 110A-110M to provide a plurality of lit line images 132A-132C each having a uniform and high-intensity light output, while a plurality of lit line images are provided via a corresponding number of light pipes. For example, as described below in connection with FIG. 3, two pair of lit line images are displayed.

Figure 3:
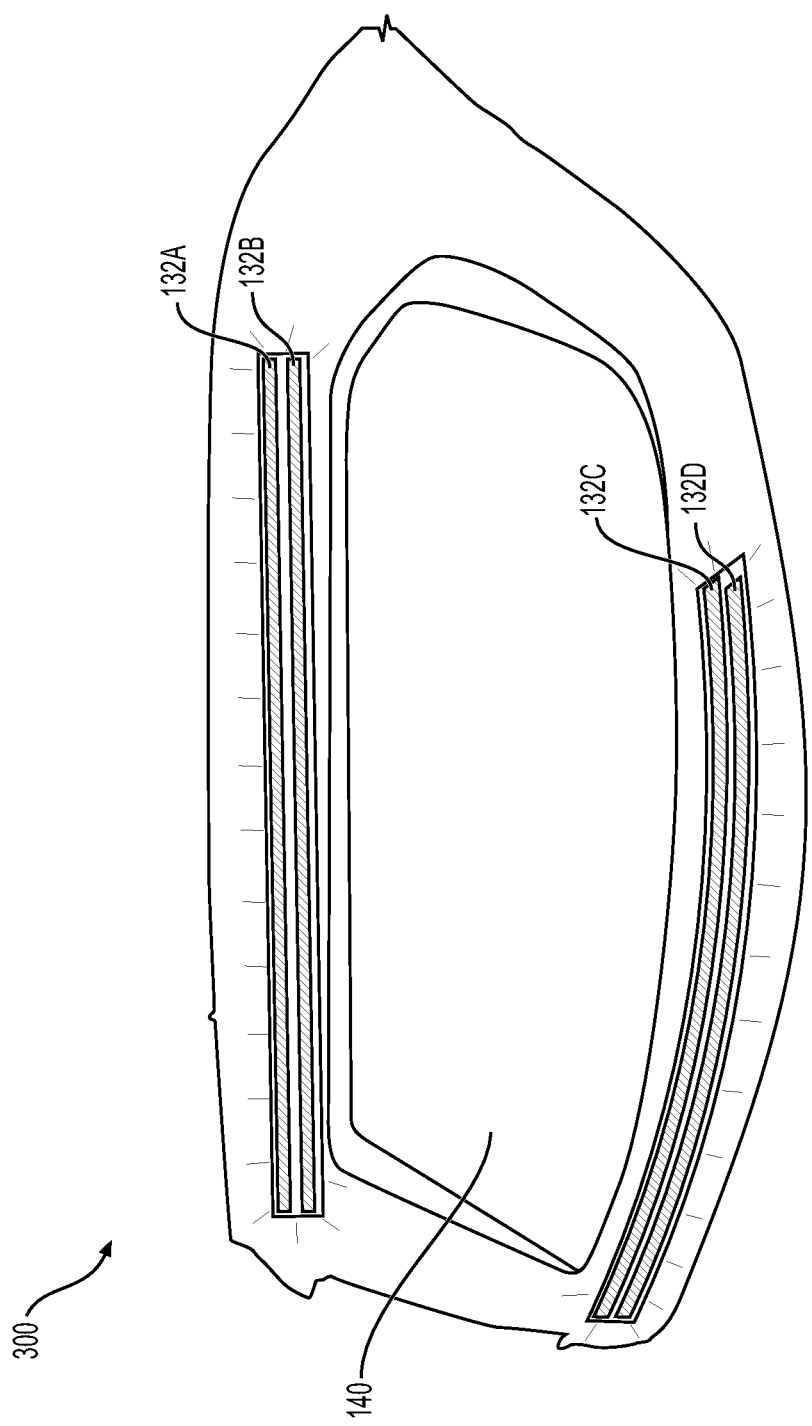
FIG. 3 is a perspective view of a lamp assembly having a line-image lighting system in which two pairs of lit line images are produced, in an embodiment.

Although FIGS. 1 and 2A-2C depict a straight line-image lighting system 100, all of the components of system 100 (e.g., PCB 115, optical sheet 120, and light pipe 130) may be curved lengthwise along a matching curvilinear path to form a curvilinear lighting system (see e.g., FIG. 3).

FIG. 3 is a perspective view of a lamp assembly 300 having an exemplary line-image lighting system in which two pairs of lit lines are produced. For example, a first lit line image 132A and a second lit line image 132B are provided along an upper portion of the lamp assembly 300, and a third lit line image 132C and a fourth lit line image 132D are provided along a lower portion of the lamp assembly 300. An interior portion 140 of the lamp assembly 300 may include one or more light sources, lenses, and/or additional lighting features of a lamp assembly (not shown), such as components for providing automotive stop, turn, and tail-light functions.

The first pair of lit line images 132A-132B are produced by a first line of light sources, similar to light sources 110A-110M of FIG. 2C, aligned with a first optical sheet, similar to optical sheet 120 of FIG. 2B, and a first pair of light pipes, similar to first and second light pipes 130A-130B of FIG. 2A. The first pair of light pipes are disposed adjacent one another and the optical sheet opposite the first line of light sources, similar to the arrangement depicted in FIG. 1. Similarly, the second pair of lit line images 132C-132D are produced by a second line of light sources, similar to light sources 110A-110M of FIG. 2C, aligned with a second optical sheet, similar to optical sheet 120 of FIG. 2B, and a second pair of light pipes, similar to light pipes 130A-130B of FIG. 2A. The second pair of light pipes are disposed adjacent one another and the optical sheet opposite the second line of light sources, similar to the arrangement depicted in FIG. 1. The first and second lines of light sources may each be operated independently, for example, via a controller (e.g., controller 450 of FIG. 9). As illustrated in FIG. 3, the two pairs of lit line images follow the curvature/sweep of lamp assembly 300. The curvature/sweep of each pair of lit line images is achieved by the PCB, on which the light sources are mounted, having a matching curvature/sweep, and the optical sheet and pair of light pipes also having a matching curvature/sweep.

Figure 4A:
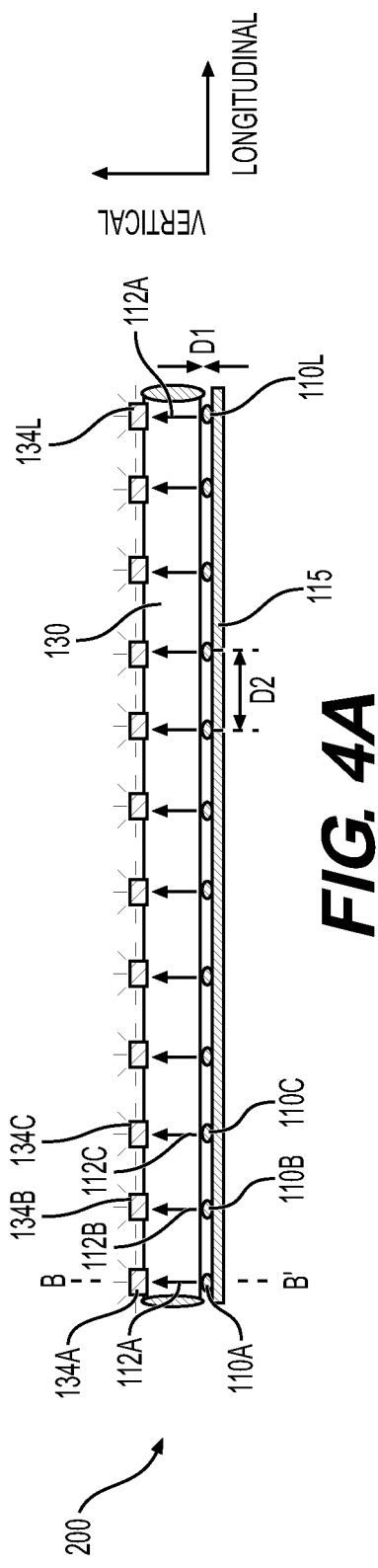
FIG. 4A is a side view of a spot-image lighting system, in an embodiment.

FIG. 4A is a side view of an exemplary spot-image lighting system 200. Spot-image lighting system 200 differs from line-image lighting system 100 of FIG. 1 in that the light sources (e.g., light sources 110A-110L on PCB 115) are immediately adjacent the light pipe 130. Therefore, the distance D1 depicted in FIG. 1 is negligible or substantially zero in system 200. Also, optical sheet 120 is optional for system 200. For example, the embodiment depicted in FIG. 4A is lacking an optical sheet, although optical sheets may be employed in other embodiments (see e.g., the embodiments of FIGS. 6A-6C). The lines labeled B-B' shown in FIG. 4A illustrate the location of the cross sections depicted in FIGS. 5A-5C, described below. The effect of the system 200 arrangement is that light emitted from each of the plurality of light sources 110A-110L transmits through the light pipe 130, as represented by arrows 112A-112L, to form a plurality of lit images 134A-134L displayed along the light pipe 130 as depicted in the top-down view of FIG. 4B.

Figure 4B:
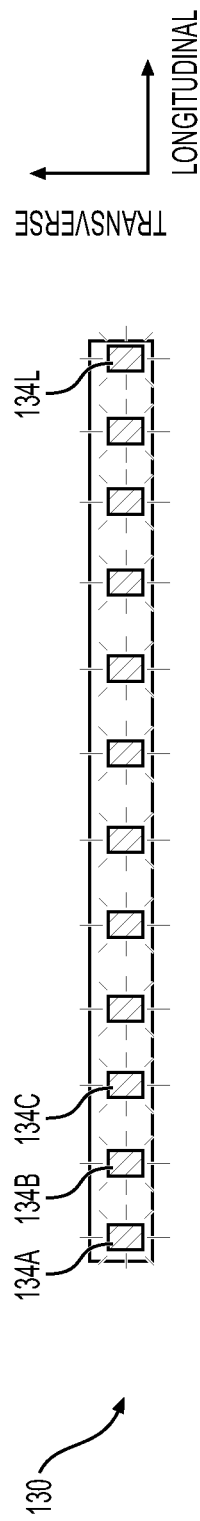
FIG. 4B is a top-down view of the spot-image lighting system of FIG. 4A.

FIG. 4B is a top-down view of spot-image lighting system 200 of FIG. 4A. Via the top-down vantage, only light pipe 130 is viewable since the underlying components (e.g., PCB 115) are hidden from view. A plurality of spot images 134A-134L are projected from the light pipe 130, with each of the spot images 134A-134L corresponding to a respective one of the plurality of light sources 110A-110L. The light pipe 130 functions as a lens to collect and collimate light emitted from light sources 110A-110L. By using light sources having a small emitting surface relative to a substantially larger diameter of light pipe 130, most of the light emitted from light sources 110A-110L is collected and collimated. The effect is to produce highly collimated and intense spots images or bands of light projected from light pipe 130. In certain embodiments, light pipe 130, having a sufficiently large diameter, efficiently collects the total light emission from each of the light sources 110A-110L and light pipe 130 collimates the light so that substantially all of the emitted light is projected from light pipe 130. Collimation of the light increases the intensity of the corresponding spot images 134A-134L by focusing/collecting the light in a specific area. In contrast to the lit line images 130A-C of FIG. 2A and 132A-D of FIG. 3, the lit images 134A-134L of FIGS. 4A-4B do not merge to appear as a homogenous line but instead appear distinct from one another.

Another difference between spot-image lighting system 200 and line-image lighting system 100 of FIG. 1 is that only a single light pipe 130 is employed in system 200, although additional light pipes may be used in some embodiments (see e.g., FIG. 6C). Although FIGS. 4A-4B depict a straight line-image lighting system 200, all of the components of system 200 (e.g., PCB 115 and light pipe 130) may be curved lengthwise along a matching curvilinear path to form a curvilinear lighting system, for use in e.g., curved/swept vehicle lamp assemblies. Since each of the light sources 110A-110L is individually controllable (e.g., via controller 450 of FIG. 9), a variety of animated lighting effects may also be achieved via system 200 as described below.

Figure 5C:
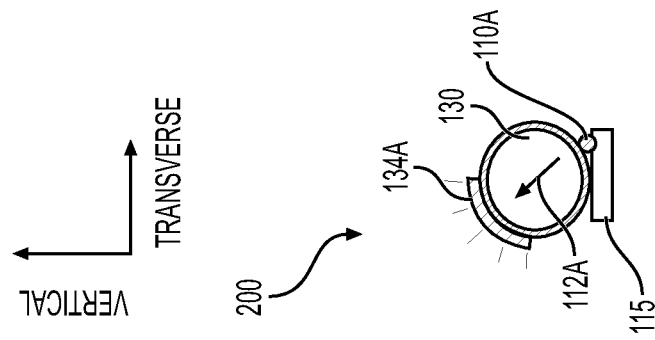
FIG. 5C is a cross-sectional side view of the spot-image lighting system of FIG. 5A with the light source disposed right-of-center with respect to a light pipe.
Figure 5B:
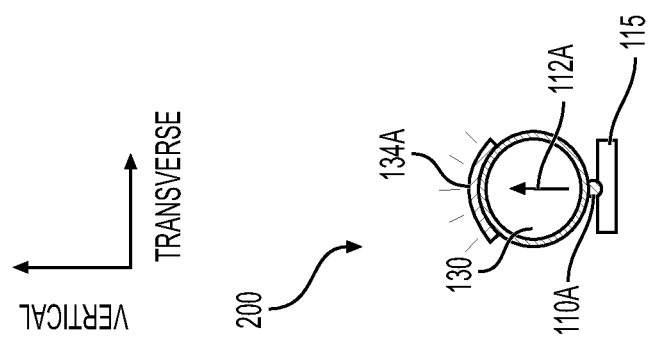
FIG. 5B is a cross-sectional side view of the spot-image lighting system of FIG. 5A with the light source disposed substantially in the center of the light pipe.
Figure 5A:
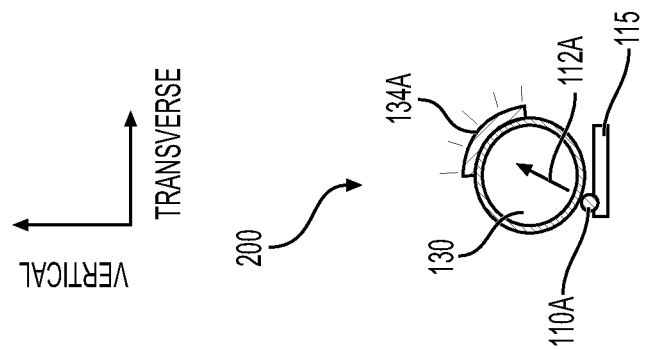
FIG. 5A is a cross-sectional side view of the spot-image lighting system of FIG. 4A with a light source disposed left-of-center with respect to a light pipe.

FIGS. 5A-5C provide a cross-sectional side view of system 200 of FIG. 4A in which the light sources are located on PCB 115 to direct light at different angles with respect to the light pipe 130 such that the direction of collimated light projected from the light pipe is shifted. The cross-sectional view depicted in FIGS. 5A-5C corresponds with the B-B' line shown in FIG. 4A. In FIG. 5A, light source 110A is disposed left-of-center with respect to light pipe 130 such that the light is directed at an angle across the light pipe 130, as represented by the arrow labeled 112A, such that first lit image 134A is projected off-center across the light pipe 130 from light source 110A. In FIG. 5B, light source 110A is disposed substantially in the center of the light pipe 130 such that the light, indicated by the arrow labeled 112A, is directed substantially vertically, and the first lit image 134A is projected on top of light pipe 130. In FIG. 5C, light source 110A is disposed right-of-center such that the light is directed at an angle across the light pipe 130, as indicated by the arrow labeled 112A, such that the first lit image 134A is projected off-center across the light pipe from light source 110A. In addition to these examples, the light source 110A may be aligned in various ways for projecting light at various directions across the diameter of light pipe 130. The appearance of the lit image 134A is oriented on light pipe 130 based on the position of the light source 110A on the opposite side of light pipe 130. Along a line of light sources (e.g., light sources 110A-110L of FIG. 4A), each light source may be independently positioned on PCB 115 such that the plurality of lit images 134A-134L projected on light pipe 130 may be directed at various viewing angles.

Vehicle lamps typically have intensity requirements for inboard, outboard, upward, and downward viewing angles. By shifting the position of the light sources 110A-110L on PCB 115 with respect to light pipe 130, collimation of light may be directed to help meet these intensity requirements. For example, directing the lit images 134A-134L is an important factor in enabling legal lighting requirements to be met (e.g., for DRL, stop/taillight and turn functions).

FIGS. 6A-6C are cross-sectional side views of spot-image lighting system 200 arranged with additional components to provide different exemplary line-image lighting systems 210, 220, and 230 for producing different high power lit appearances. FIGS. 7A-7C are top-down views of lighting systems 210, 220, and 230, respectively. FIGS. 6A-6C and FIGS. 7A-7C are best viewed together with the following description.

In FIG. 6A, line-image lighting system 210 includes components of system 200, as described above in connection with FIGS. 4A, 4B, and 5B, positioned beneath optical sheet 120, as described above in connection with FIGS. 1 and 2B. Optical sheet 120 smooths and spreads the lit images 134A-134L shown in FIG. 4B. Based on an intensity of light from light sources 110A-110L, a diameter of light pipe 130, and a distance D3 between light pipe 130 and optical sheet 120, a line image may be formed. For example, as depicted in the top-down view of FIG. 7A, the line image 136 is projected longitudinally along light pipe 130. A width of the line image 136 is dependent on a diameter of the light pipe 130.

In FIG. 6B, line-image lighting system 220 is similar to system 210 of FIG. 6A except that it includes a second optical sheet. Specifically, a first optical sheet 120A is arranged beneath a second optical sheet 120B. In certain embodiments, the light-modifying elements of the first and second optical sheets 120A, 120B are aligned perpendicular to one another for homogenizing light in a first direction and a second direction perpendicular to the first direction. For example, the light-modifying elements of the first and second optical sheets 120A, 120B may be aligned transversely and longitudinally, respectively, with respect to light pipe 130. The effect is to smooth and spread the lit images 134A-134L shown in FIG. 4B both longitudinally and transversely such that the line image 136 is projected more broadly across the light pipe 130, as depicted in the top-down view of FIG. 7B.

In other embodiments, the light-modifying elements of the first and second optical sheets 120A, 120B are aligned parallel with one another and with the light pipe 130. For example, the light-modifying elements of both optical sheets 120A, 120B may be oriented longitudinally.

The first and second optical sheets 120A, 120B may be arranged immediately adjacent one another or spaced apart by a gap of a distance D4, as depicted in FIG. 6B. In embodiments, the distance D4 is about 2-mm or between 2-mm and 5-mm or between 2-mm and 10-mm By spacing the optical sheets 120A, 120B apart, homogeneity is improved. For optical sheets 120A, 120B aligned in parallel with one another, spacing them apart eliminates optical anomalies exhibited when two optical sheets are placed one right on top of the other.

In FIG. 6C, line-image lighting system 230 is similar to system 210 of FIG. 6A except that it includes additional light pipes disposed above optical sheet 120. This arrangement combines the line-image lighting system 100 of FIG. 1 with the spot-image lighting system 200 of FIG. 5B. The effect is to produce a plurality of lit line images, one for each of the additional light pipes. For example, as depicted in FIG. 6C, first light pipe 130A may be considered the primary light pipe and is positioned adjacent PCB 115 having light sources 110A-110L. The primary light pipe collimates and thus magnifies the intensity of the light. Three secondary light pipes, namely a second light pipe 130B, a third light pipe 130C, and a fourth light pipe 130D, are positioned immediately adjacent optical sheet 120, opposite the first light pipe 130A. The second, third, and fourth light pipes 130B-130D each produce a corresponding "secondary" lit line image, namely a second lit line image 134B, a third lit line image 134C, and a fourth lit line image 134D. Only the secondary lit line images 134B-134D are projected from system 230, as depicted in the top-down view of FIG. 7C. Since light from the primary light pipe (e.g., first light pipe 130A) is already collimated, the secondary light pipes (e.g., light pipes 130B-D) project the light into a plurality (e.g., three) lit line images but do not further collimate the light.

In certain embodiments, the intensity of light produced using line-image lighting system 230 is sufficiently bright to provide automotive lighting functions (e.g., stop signal, turn signal, and taillight illumination). A diameter of the secondary light pipes 130B-130D may each be the same or different to affect the width of the lit line images 134B-134D that are projected. The number of secondary light pipes may be greater than three or fewer than three without departing from the scope hereof.

Although FIGS. 7A-7C depict straight line-image lighting systems 210, 220, and 230, respectively, all of the components of systems 210, 220, 230 (e.g., PCB 115, optical sheet(s), light pipe(s)) may be curved lengthwise along a curvilinear path to form a curvilinear lighting system, for use in e.g., curved/swept vehicle lamp assemblies.

Compared with line-image lighting system 100 of FIG. 1, an advantage of the line-image lighting system 230 of FIG. 6C is that a much higher intensity of the lit line images is produced for the same light sources and same diameter light pipes. A disadvantage of system 230 of FIG. 6C compared with system 100 of FIG. 1 is that having the first light pipe 130A placed directly over the light sources 110A-100L collimates and focuses the light by narrowing the angle of emission. Therefore, by having distance D1 greater than zero, system 100 of FIG. 1 may be used to illuminate a larger number or larger diameter of light pipes compared to system 230 of FIG. 6C, since system 100 of FIG. 1 takes advantage of the large spread of light emitted from light sources 110A-110M. In contrast, system 230 of FIG. 6C may illuminate a smaller number or smaller diameter of light pipes since all of the secondary light pipes have to be arranged within the path of collimated light emitted from the primary light pipe.

FIG. 8A is a cross-sectional side view of spot-image lighting system 200 arranged with additional components to provide another exemplary line-image lighting system 240 for producing a different high power lit appearance. FIG. 8B is a top-down view of line-image lighting system 240. The A-A' line of FIG. 8B indicates the cross-sectional location of FIG. 8A. Items enumerated in FIGS. 8A-8B with like numerals to FIGS. 1-7C are the same or similar and their description may not be repeated accordingly. FIGS. 8A and 8B are best viewed together with the following description.

A diffuser lens 150 is disposed next to optical sheet 120. Diffuser lens 150 is configured to further diffuse and homogenize light after passing through optical sheet 120 to provide a smoothed lit line image 138. Optical sheet 120 may be positioned distance D3 from light pipe 130 and a distance D4 from diffuser lens 150. In the embodiment depicted in FIG. 8A, the distance D4 is less than the distance D3 (D4<D3). In an embodiment, D3 is about 5-mm and D4 is about 2-mm. The distance D4 is greater than zero, and preferably at least 2-mm, to provide an air gap between the first and second optical sheets 120A, 120B for reducing accumulation of condensation. In embodiments, line-image lighting system 240 is arranged across the front of a vehicle (e.g., side-to-side from one headlight to the other) to form a DRL.

Figure 9:
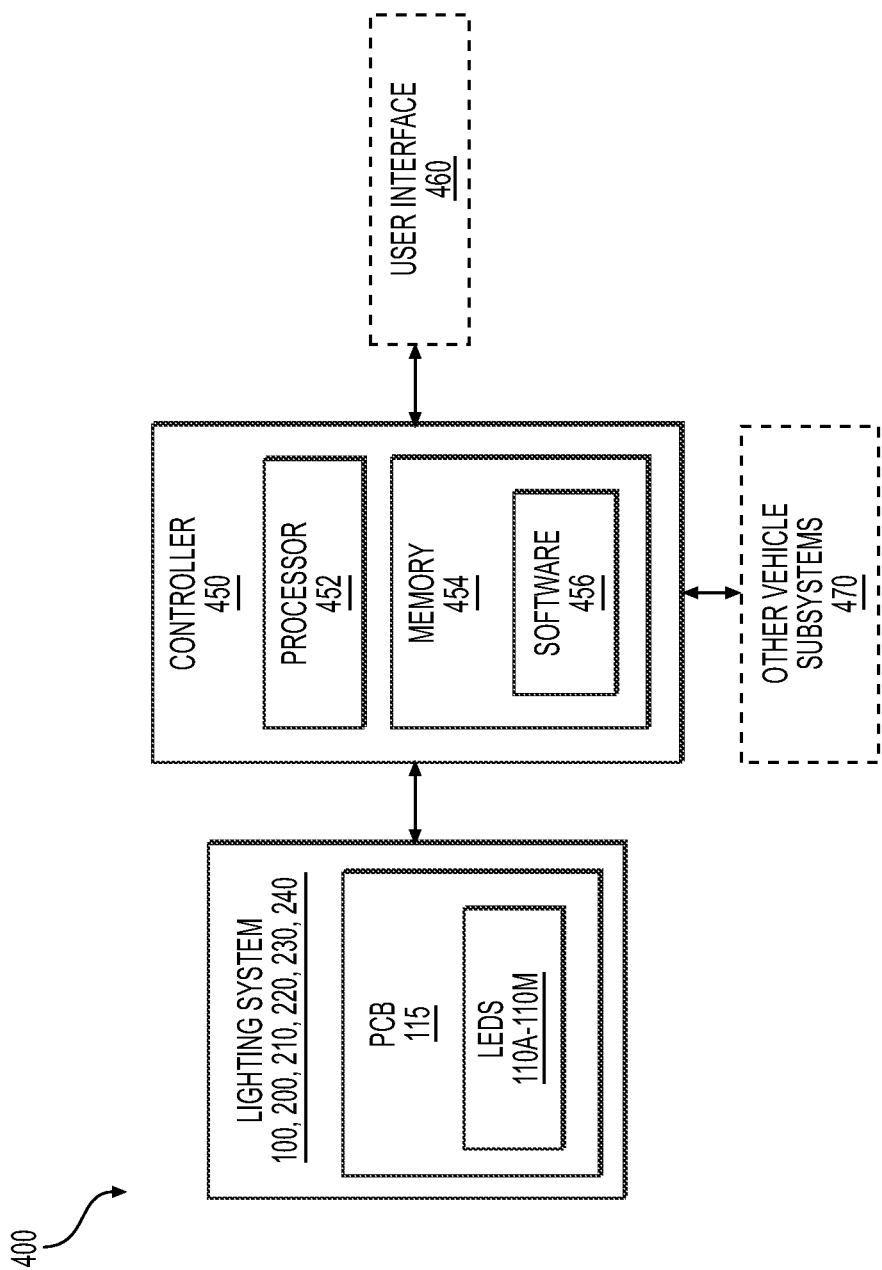
FIG. 9 is a block diagram showing components of a system for controlling image lighting systems, in an embodiment.

FIG. 9 is a block diagram showing components of an exemplary control system 400 for controlling line-image lighting system 100, and spot-image lighting system 200, and line-image lighting systems 210, 220, and 230. Control system 400 includes a controller 450, which is for example a computer, microcontroller, microprocessor, or programmable logic controller (PLC) having a memory 454, including a non-transitory medium for storing software 456, and a processor 452 for executing instructions of software 456. An optional user interface 460 enables a user to transmit instructions and receive information, as further described below. The controller 450 is not limited by the materials from which it is formed or the processing mechanisms employed therein and, as such, may be implemented via semiconductor(s) and/or transistors (e.g., electronic integrated circuits (ICs)), and so forth.

In certain embodiments, user interface 460 includes a user input device, which may include one or more buttons or switches located in a vehicle cabin or on a handheld device (e.g., a key fob) for controlling the image lighting systems 100, 200, 210, 220, and 230. In some embodiments, user interface 460 includes a touch screen display device configured for receiving touch indications by the user. The touch screen display device may be located in the vehicle cabin and/or accessed remotely via a mobile device (e.g., smartphone, tablet, or laptop computer). User interface 460 may be configured to present a menu for selecting various patterns via the plurality of light sources employed in image lighting systems 100, 200, 210, 220, and 230.

Control system 400 of FIG. 9 enables image lighting systems 100, 200, 210, 220, and 230 to provide custom appearances (e.g., stylistic features or lighting), which are optionally integrated within automotive lamp assemblies including but not limited to headlight and taillight assemblies, daylight-running lights (DRLs), center high-mounted stop lamps, multi-function light assemblies, fog lamps, and turn signals. In certain embodiments, controller 450 is optionally coupled communicatively with other vehicle subsystems 470. For example, controller 450 may be programmed with instructions for controlling one or more light sources 110A-110M in coordination with other vehicle subsystems 470. This enables automatic control of the image lighting systems 100, 200, 210, 220, and 230 based on input signals provided by other subsystems of the vehicle. For example, when a user locks or unlocks the vehicle doors via a key fob, image lighting systems 100, 200, 210, 220, and 230 may illuminate. For a vehicle taillight having image lighting systems 100, 200, 210, 220, and 230 integrated therein, the light sources may be illuminated based on a stop signal from a braking subsystem, or the light sources may be controlled to blink in coordination with a turn signal.

Communication between user interface 460, controller 450, other vehicle subsystems 470, and the image lighting systems 100, 200, 210, 220, and 230 may be by a wired and/or wireless communication media. For example, controller 450 may include a transmitter/receiver, a multichannel input/output (I/O) data bus, or the like (not shown) for communicatively coupling with user interface 460 and PCB 115 of lighting systems 100, 200, 210, 220, and 230. The controller 450 is programmed with instructions for sending signals to the PCB 115 for switching light sources on/off or for dimming the light sources via for example pulse-width modulation (PWM). Other electronics known to those of skill in the art may be used in conjunction with the controller 450 for controlling light sources and providing PWM without departing from the scope hereof. The programmed instructions may be predetermined and/or responsive to inputs from the user interface 460 or other vehicle subsystems 470. For example, programmed instructions may be used to dynamically illuminate light sources 110A-110M in a variety of predetermined or random patterns, which may be configured for producing custom or variable stylistic or decorative features on the exterior of a vehicle, including lighting effects having different colors (e.g., via control of differently colored LEDs) and animated lighting effects.

Features described above as well as those claimed below may be combined in various ways without departing from the scope hereof. The following examples illustrate some possible, non-limiting combinations:

(A1) A lamp assembly for a vehicle includes a plurality of light-emitting diodes (LEDs) mounted in or on the vehicle, the plurality of LEDs being arranged in a linear pattern, and an elongated optical member disposed longitudinally along the linear pattern of the plurality of LEDs, the elongated optical member being configured to receive light emitted from the plurality of LEDs and project a corresponding plurality of lit images.

(A2) For the lamp assembly denoted as (A1), the elongated optical member may be configured to radially focus the light from the LEDs into the corresponding plurality of lit images.

(A3) For the lamp assembly denoted as (A1) or (A2), the elongated optical member may be positioned a first distance from the linear pattern of LEDs, the first distance being greater than a diameter of the elongated optical member.

(A4) For the lamp assembly denoted as any of (A1) through (A3), the plurality of LEDs may each be spaced apart in the linear pattern by a second distance, the second distance being less than the first distance.

(A5) For the lamp assembly denoted as any of (A1) through (A4), an optical sheet may be disposed between the plurality of LEDs and the elongated optical member, the optical sheet being configured to homogenize the light received from the plurality of LEDs such that the corresponding plurality of lit images appear as one homogenous line image.

(A6) For the lamp assembly denoted as any of (A1) through (A5), the optical sheet includes a plurality of light-modifying elements, the plurality of light-modifying elements may be configured for diffusing light along a longitudinal direction of the elongated optical member for smoothing light from the plurality of LEDs.

(B1) A vehicle lamp assembly includes a plurality of light-emitting diodes (LEDs) mounted to a printed-circuit board to form a linear array of LEDs, and a primary light pipe disposed adjacent to the linear array of LEDs and aligned longitudinally along the linear array of LEDs, such that light emitted from each of the LEDs of the linear array traverses radially through the primary light pipe.

(B2) For the vehicle lamp assembly denoted as (B1), the primary light pipe may be disposed immediately adjacent to the linear array of LEDs such that no gap exists therebetween, thereby forming a plurality of spot images projected from the primary light pipe.

(B3) For the vehicle lamp assembly denoted as (B1) or (B2), a first optical sheet may be disposed adjacent to the light pipe for homogenizing the light from the primary light pipe to form a lit line image along a longitudinal length of the light pipe.

(B4) For the vehicle lamp assembly denoted as any of (B1) through (B3), a second optical sheet may be disposed adjacent to the first optical sheet opposite the primary light pipe for further homogenizing the light.

(B5) For the vehicle lamp assembly denoted as any of (B1) through (B4), the first optical sheet and the second optical sheet may each include a plurality of aligned light modifying members, and the plurality of aligned light modifying members of the first optical sheet may be arranged perpendicular to the plurality of aligned light modifying members of the second optical sheet such that light is homogenized in both a first direction and a second direction perpendicular to the first direction.

(B6) For the vehicle lamp assembly denoted as any of (B1) through (B5), the first optical sheet and the second optical sheet may each include a plurality of aligned light modifying members, and the plurality of aligned light modifying members of the first optical sheet may be arranged parallel to the plurality of aligned light modifying members of the second optical sheet, and the first optical sheet is disposed adjacent the second optical sheet with a gap therebetween.

(B7) For the vehicle lamp assembly denoted as any of (B1) through (B6), a secondary light pipe may be provided adjacent the first optical sheet opposite the primary light pipe, such that homogenized light from the first optical sheet is configured to illuminate the secondary light pipe for providing a lit line image.

(B8) For the vehicle lamp assembly denoted as any of (B1) through (B7), a plurality of secondary light pipes may be provided adjacent the first optical sheet opposite the primary light pipe, such that homogenized light from the first optical sheet is configured to illuminate the plurality of secondary light pipes for providing a plurality of lit line images.

(B9) For the vehicle lamp assembly denoted as any of (B1) through (B8), a diffuser lens may be disposed adjacent to the first optical sheet opposite the primary light pipe for further homogenizing the light.

Many different arrangements of the various components depicted, as well as components not shown, are possible without departing from the spirit and scope of the present disclosure. Embodiments of the present disclosure have been described with the intent to be illustrative rather than restrictive. Embodiments of the present disclosure have been described in the context of vehicle headlamps, but other uses and alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A lamp assembly for a vehicle, comprising:
a plurality of light-emitting diodes (LEDs) mounted in or on the vehicle, the plurality of LEDs being arranged in a linear pattern;
a first light pipe member disposed longitudinally in alignment with the linear pattern of the plurality of LEDs, wherein the light pipe is positioned at a first distance from the plurality of LEDs, the first light pipe member being configured to receive light emitted from the plurality of LEDs and project a corresponding plurality of lit images;
a second light pipe member disposed longitudinally adjacent the first light pipe member, wherein the second light pipe member is positioned at the first distance from the plurality of LEDs; and an optical sheet disposed between the plurality of LEDs and the first and second light pipe members, the optical sheet being configured to homogenize the light received from the plurality of LEDs to provide a first homogenous line image and a second homogenous line image, wherein the first and second homogenous line images have a uniform intensity and light output.

2. The lamp assembly of claim 1 wherein the first distance is greater than a diameter of the first light pipe member.

3. The lamp assembly of claim 2 wherein the plurality of LEDs are each spaced apart in the linear pattern by a second distance, the second distance being less than the first distance.

4. The lamp assembly of claim 1 wherein an the optical sheet is disposed directly adjacent the light pipe and the second light pipe member.

5. The lamp assembly of claim 4 wherein the optical sheet comprises a plurality of light-modifying elements, the plurality of light-modifying elements being configured for diffusing light along a longitudinal direction of the first and second light pipe members for smoothing light from the plurality of LEDs.

6. A vehicle lamp assembly, comprising:

a plurality of light-emitting diodes (LEDs) mounted to a printed-circuit board to form a linear array of LEDs;

a primary light pipe disposed adjacent to the linear array of LEDs and aligned longitudinally along the linear array of LEDs, such that light emitted from each of the LEDs of the linear array traverses radially through the primary light pipe, wherein the primary light pipe is disposed immediately adjacent to the linear array of LEDs such that no gap exists therebetween, thereby forming a plurality of spot images projected from the primary light pipe;

a first optical sheet disposed adjacent to the primary light pipe for homogenizing light from the primary light pipe to form a lit line image along a longitudinal length of the primary light pipe, wherein the first optical sheet is positioned at a predetermined distance from the linear array of LEDs to form a gap therebetween; and a secondary light pipe adjacent the first optical sheet opposite the primary light pipe, such that homogenized light from the first optical sheet is configured to illuminate the secondary light pipe for providing a lit line image.

7. The vehicle lamp assembly of claim 6 further comprising a second optical sheet disposed adjacent to the first optical sheet opposite the primary light pipe for further homogenizing the light.

8. The vehicle lamp assembly of claim 7 wherein the first optical sheet and the second optical sheet each comprise a plurality of aligned light modifying members, and the plurality of aligned light modifying members of the first optical sheet are arranged perpendicular to the plurality of aligned light modifying members of the second optical sheet such that light is homogenized in both a first direction and a second direction perpendicular to the first direction.

9. The vehicle lamp assembly of claim 7 wherein the first optical sheet and the second optical sheet each comprise a plurality of aligned light modifying members, and the plurality of aligned light modifying members of the first optical sheet are arranged parallel to the plurality of aligned light modifying members of the second optical sheet, and the first optical sheet is disposed adjacent the second optical sheet with a gap therebetween.

10. The vehicle lamp assembly of claim 6 further comprising a plurality of secondary light pipes adjacent the first optical sheet opposite the primary light pipe, such that homogenized light from the first optical sheet is configured to illuminate the plurality of secondary light pipes for providing a plurality of lit line images.

11. The vehicle lamp assembly of claim 6 further comprising a diffuser lens disposed adjacent to the first optical sheet opposite the primary light pipe for further homogenizing the light.

12. The vehicle lamp assembly of claim 6, wherein the linear array of LEDs is disposed off-center from the primary light pipe such that light emitted from the primary light pipe is projected off-center.

13. The vehicle lamp assembly of claim 6, wherein the primary light pipe has the same diameter as the secondary light pipe.

* * * * *